United States Patent
Heo

(10) Patent No.: US 11,124,237 B2
(45) Date of Patent: Sep. 21, 2021

(54) FRONT STRUCTURE OF VEHICLE BODY

(71) Applicants: Hyundai Motor Company, Seoul (KR); Kia Motors Corporation, Seoul (KR)

(72) Inventor: Chul Hee Heo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 104 days.

(21) Appl. No.: 16/545,535

(22) Filed: Aug. 20, 2019

(65) Prior Publication Data

US 2020/0324821 A1 Oct. 15, 2020

(30) Foreign Application Priority Data

Apr. 11, 2019 (KR) .......................... 10-2019-0042691

(51) Int. Cl.
| | | |
|---|---|---|
| B62D 21/15 | (2006.01) | |
| B62D 25/14 | (2006.01) | |
| B62D 25/16 | (2006.01) | |
| B62D 25/08 | (2006.01) | |
| B60R 19/34 | (2006.01) | |

(52) U.S. Cl.
CPC ............ B62D 21/152 (2013.01); B60R 19/34 (2013.01); B62D 25/088 (2013.01); B62D 25/145 (2013.01); B62D 25/16 (2013.01)

(58) Field of Classification Search
CPC .. B62D 21/152; B62D 25/145; B62D 25/088; B62D 25/081; B62D 25/082

USPC .......................... 296/187.09, 193.09, 203.02
See application file for complete search history.

(56) References Cited

U.S. PATENT DOCUMENTS

| | | | | |
|---|---|---|---|---|
| 8,128,160 B2* | 3/2012 | Leanza | ................ | B62D 25/082 |
| | | | | 296/203.02 |
| 8,746,784 B2* | 6/2014 | Hanakawa | ........... | B62D 25/088 |
| | | | | 296/193.09 |
| 11,014,611 B2* | 5/2021 | Kim | ................... | B62D 25/2018 |
| 2002/0056969 A1* | 5/2002 | Sawai | .................. | B62D 25/082 |
| | | | | 280/124.146 |
| 2015/0274211 A1* | 10/2015 | Riedl | ................... | B62D 25/084 |
| | | | | 296/187.09 |
| 2019/0210656 A1* | 7/2019 | Guariento | ............ | B62D 29/008 |

(Continued)

FOREIGN PATENT DOCUMENTS

| | | | | | |
|---|---|---|---|---|---|
| CN | 109476348 A | * | 3/2019 | ........... | B62D 21/157 |
| FR | 2907751 A3 | * | 5/2008 | ........... | B62D 25/082 |

(Continued)

*Primary Examiner* — Jason S Morrow
*Assistant Examiner* — Kevin P Weldon
(74) *Attorney, Agent, or Firm* — Mintz Levin Cohn Ferris Glovsky and Popeo, P.C.; Peter F. Corless

(57) ABSTRACT

A front structure of a vehicle body is provided. The front structure includes shock-absorber housings disposed between the front side of a dash panel and the lower end of a front windshield glass, shock-absorber mounts coupled to the upper sides of the shock-absorber housings, and a cross member that extends in the lateral direction of the vehicle while being spaced apart from the dash panel in the forward direction. The cross member has a rear surface portion, and each of the opposite ends of the rear surface portion is coupled to the front end portion of a respective one of the shock-absorber housings.

11 Claims, 6 Drawing Sheets

(56) References Cited

U.S. PATENT DOCUMENTS

| | | | |
|---|---|---|---|
| 2020/0283068 A1* | 9/2020 | Murai | B62D 25/085 |
| 2020/0324821 A1* | 10/2020 | Heo | B62D 25/16 |
| 2020/0324824 A1* | 10/2020 | Kim | B62D 25/04 |
| 2020/0324826 A1* | 10/2020 | Heo | B60S 1/0438 |

FOREIGN PATENT DOCUMENTS

| | | | | |
|---|---|---|---|---|
| KR | 20140058222 A | * | 5/2014 | |
| KR | 101795403 B1 | | 11/2017 | |
| WO | WO-2006032973 A1 | * | 3/2006 | B62D 21/152 |
| WO | WO-2018073051 A1 | * | 4/2018 | B62D 25/02 |

\* cited by examiner

FRONT STRUCTURE OF VEHICLE BODY

CROSS-REFERENCE TO RELATED APPLICATION

This application claims the priority benefit of Korean Patent Application No. 10-2019-0042691, filed on Apr. 11, 2019, the disclosure of which is incorporated herein by reference.

BACKGROUND

1. Field of the Invention

The present invention relates to a front structure of a vehicle body, and more particularly, to a front structure of a body of a micro-mobility vehicle having a short front overhang, which may be installed to prevent interference with parts of a chassis of the vehicle and which may secure improved impact resistance and may increase the rigidity of the vehicle body and the rigidity of a mounting part.

2. Description of the Related Art

Recently, the concept and form of vehicles, serving as means of transportation, have changed with the development of autonomous vehicles and electric vehicles. A micro-mobility vehicle is being developed as a compact means of transportation in order to meet various needs of consumers. A micro-mobility vehicle is a type of electric vehicle that has no engine. Thus, there is a growing need to substantially reduce the size of a front engine compartment to decrease unnecessary weight and improve fuel efficiency.

If the engine compartment is reduced in size, the front structure of the vehicle body is reduced in length, and a front overhang, which is the distance between the front end of the vehicle body and the center of the front axle, is also substantially reduced, which leads to a reduction in the weight of the vehicle body and excellent mobility. However, in the case in which a front overhang becomes extremely short, in the event of a head-on collision, the front structure of the vehicle body is not capable of sufficiently absorbing impact, and thus a large portion of the force of an impact is transferred to the interior space of the vehicle in a short period of time. Therefore, when an overhang is designed to be short, it is necessary to improve the front structure of the vehicle body to secure impact resistance equivalent to the impact resistance of a conventional vehicle body front structure.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a front structure of a vehicle body, particularly a front structure of a body of a micro-mobility vehicle having a shortened front overhang, which may be installed to prevent interference with parts of a chassis of the vehicle and which may secure improved impact resistance and may increase the rigidity of the vehicle body and the rigidity of a mounting part.

In accordance with the present invention, the above and other objects may be accomplished by the provision of a front structure of a vehicle body, the front structure may include shock-absorber housings disposed between the front side of a dash panel and the lower end of a front windshield glass, the shock-absorber housings being disposed at upper sides thereof with shock-absorber mounts to which shock absorbers are mounted, and a cross member that extends in the lateral direction of a vehicle while being spaced apart from the dash panel in the forward direction. The cross member may include a rear surface portion, each of the opposite ends of the rear surface portion being coupled to a front end portion of a respective one of the shock-absorber housings.

The shock-absorber housings may be directly coupled to a front surface portion of the dash panel. The rear surface portion of the cross member may be coupled to upper sides of the shock-absorber mounts or to upper sides of the shock-absorber housings, or may be coupled to the upper sides of the shock-absorber mounts and to the upper sides of the shock-absorber housings. Additionally, the shock-absorber mounts may be coupled to upper sides of the shock-absorber housings such that front end portions of the shock-absorber mounts cover front end portions of the shock-absorber housings, and the cross member may be coupled to the shock-absorber mounts such that the rear surface portion of the cross member covers front end portions of the shock-absorber mounts.

The cross member may include a first cross member having a rear surface portion that extends in the upward-and-downward direction of the vehicle and coupled to the front end portions of the shock-absorber mounts and a bent portion bent from the lower end of the rear surface portion and that extends toward a front side of the vehicle. The cross member may further include a second cross member having a front surface portion that extends from the front end of the bent portion of the first cross member toward an upper side of the vehicle and a bent portion bent from the upper end of the front surface portion and that extends toward a rear side of the vehicle to be coupled to the upper end of the rear surface portion of the first cross member.

The front structure may further include fender aprons that extend in the forward direction. Among two side portions of each of the fender aprons, an inner side portion that faces the interior of the vehicle may be coupled to a respective one of end portions of the cross member and to the outer end of a respective one of the shock-absorber mounts. The fender aprons may extend forwards from front pillars up to the end portions of the cross member. Each of the fender aprons may include an inner fender apron, defining an inner side portion, and an outer fender apron, defining an outer side portion. The inner fender apron may be welded to the cross member and to a respective one of the shock-absorber mounts, and the outer fender apron may be welded to the inner fender apron.

The front structure may further include inner front pillar panels formed in a panel shape. The inner front pillar panels may include an upper portion that extends along the front windshield glass and a lower portion that extends along the dash panel. Each of the inner front pillar panels may be coupled to the rear end of the inner fender apron, and may be coupled to a respective one of lateral sides of the vehicle body together with the inner fender apron. The front structure may further include outer side panels formed as annular-shaped panels that extend along the peripheries of the doors of the vehicle. Each of the outer side panels may be coupled to the outer fender apron, and may be coupled to a side of a respective one of the inner front pillar panels and to a side of the inner fender apron together with the outer fender apron.

The front structure may further include connection parts that extend in the upward-and-downward direction of the vehicle. Each of the connection parts may include an upper end portion connected to the cross member and a lower end portion connected to a bumper support beam of the vehicle. The connection parts may include a pair of left and right connection parts. The left and right connection parts may be connected at upper end portions thereof to end portions of the cross member and may be connected at lower end portions thereof to end portions of the bumper support beam.

Each of the upper end portions of the connection parts may be coupled to a portion of the cross member that is opposite the portion of the cross member to which a corresponding one of the shock-absorber mounts is coupled. Each of the lower end portions of the connection parts may be coupled to the upper end of the portion of the bumper support beam to which a corresponding one of crash boxes is coupled.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

In recent years, next-generation vehicles such as electric vehicles have been designed to reduce the space of the engine compartment thereof and increase the interior space thereof. Accordingly, since the overhang of the vehicle body is shortened to reduce the space of the engine compartment, the length of a front side member provided in the vehicle is also decreased. However, the front side member is not capable of sufficiently absorbing impact during a head-on collision. Thus, a substantial portion of the force of an impact may be transferred to the interior space of the vehicle via the vehicle body, which leads to the increased possibility of injury to the occupant.

Figure 1:
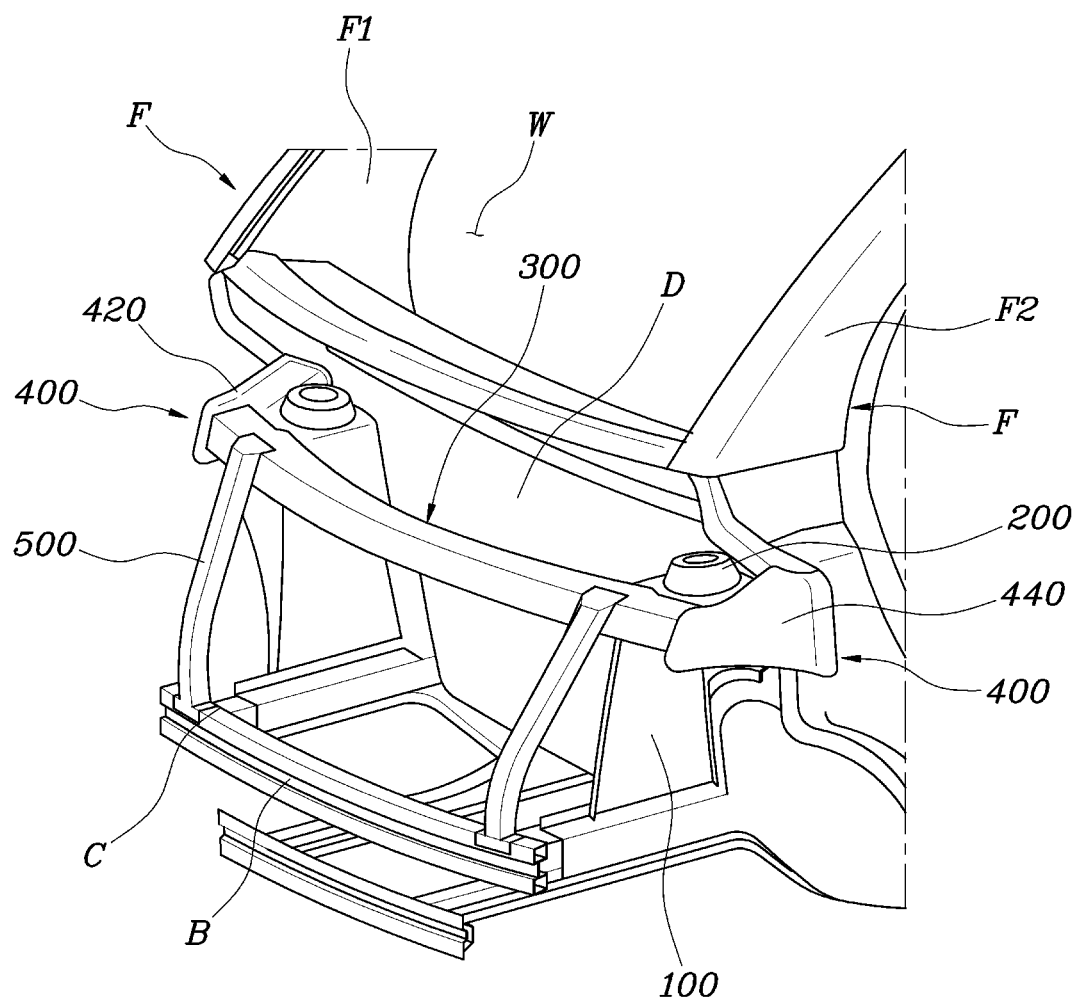
FIG. 1 is a perspective view showing a vehicle to which a front structure of a vehicle body according to an exemplary embodiment of the present invention is applied.

Therefore, the present invention provides an improved front structure of a vehicle body having a short overhang, in which a load path for effectively enduring the impact of a collision is defined. Accordingly, the front structure of a vehicle body according to the present invention, as shown in FIG. 1, may include shock-absorber housings 100, disposed between the front side of a dash panel D and the lower end of a front windshield glass W and which are disposed at the upper sides thereof with shock-absorber mounts 200, respectively, to which shock absorbers are mounted, and a cross member 300, which extends in the lateral direction of the vehicle while being spaced apart from the dash panel D in the forward direction and which are coupled to the shock-absorber housings 100.

In particular, the cross member 300 may have a rear surface portion 320, and each of opposite ends of the rear surface portion 320 may be coupled to the front end portion of a respective one of the shock-absorber housings 100. Although not illustrated in FIG. 1, the front windshield glass W may be coupled to the inner sides of front pillars F.

As shown in the drawings, the cross member 300 may be disposed in the front structure of a vehicle body according to the present invention. The cross member 300 may be coupled to the front end portions of the shock-absorber mounts 200, which are disposed at both lateral sides of the front structure of the vehicle body, to interconnect the shock-absorber mounts 200 in the lateral direction. The cross member 300 functions to define a collision load path during a head-on collision to disperse impact to the shock-absorber mounts 200, disposed at both lateral sides of the front structure of the vehicle body, via the cross member 300. In addition, the cross member 300 may also prevent distortion of the vehicle body by interconnecting the shock-absorber mounts 200 in the lateral direction.

Figure 6:
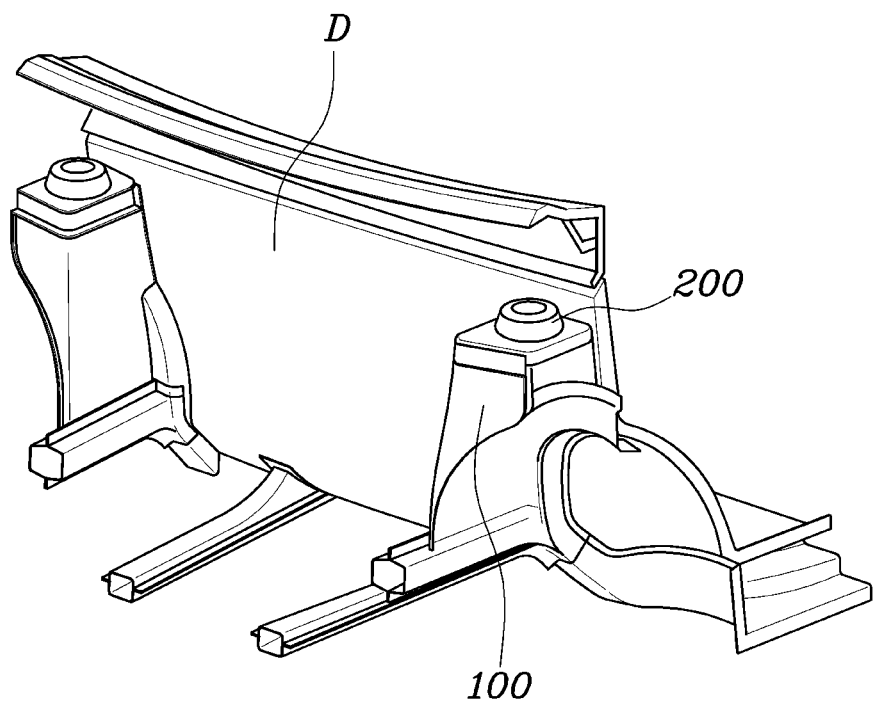
FIG. 6 is a view showing the state in which a shock-absorber housing of the front structure of a vehicle body according to the exemplary embodiment of the present invention is directly coupled to the front surface portion of a dash panel.

As shown in FIG. 6, the shock-absorber housings 100 of the present invention may be directly coupled to the front surface portion of the dash panel D. Accordingly, since the shock-absorber housings 100 may be directly coupled to the front surface portion of the dash panel D, even when the front structure of the vehicle body is substantially reduced in length, a collision load may be effectively dispersed via the cross member 300. Thus, the front structure of a vehicle body according to the present invention has an advantage of effectively dispersing a head-on collision load even when the vehicle has an extremely short overhang (e.g., a reduce overhang), like a micro-mobility vehicle.

Figure 2:
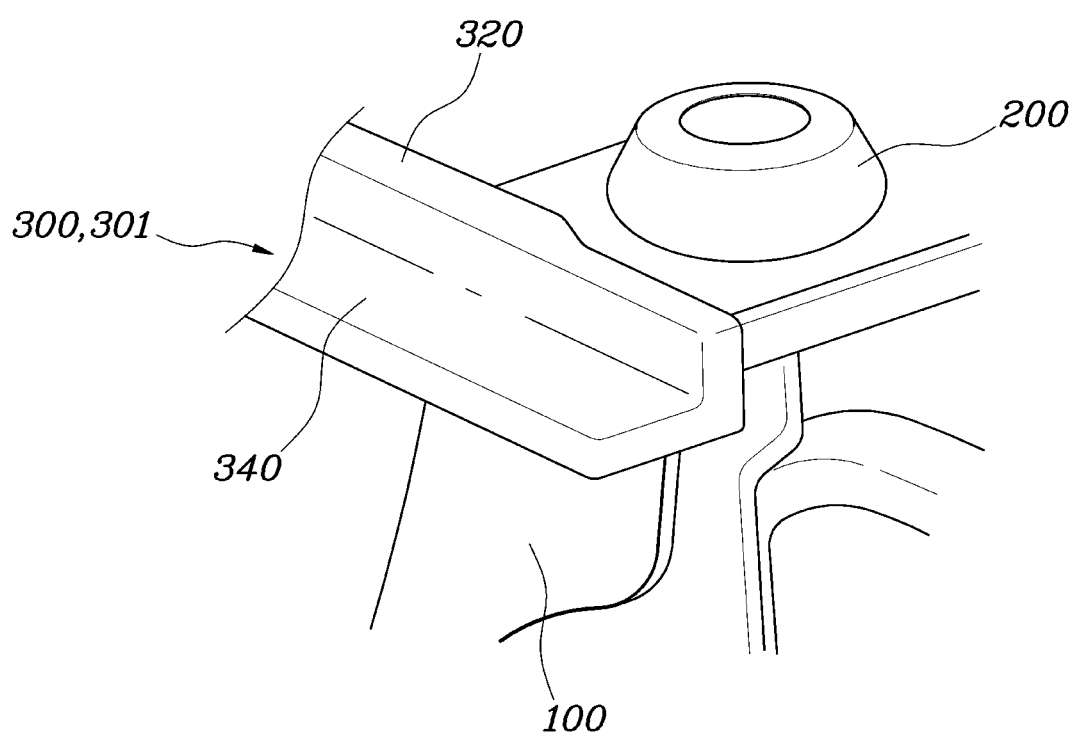
FIG. 2 is a view showing the coupling structure of a first cross member of the front structure of a vehicle body according to the exemplary embodiment of the present invention.
Figure 3:
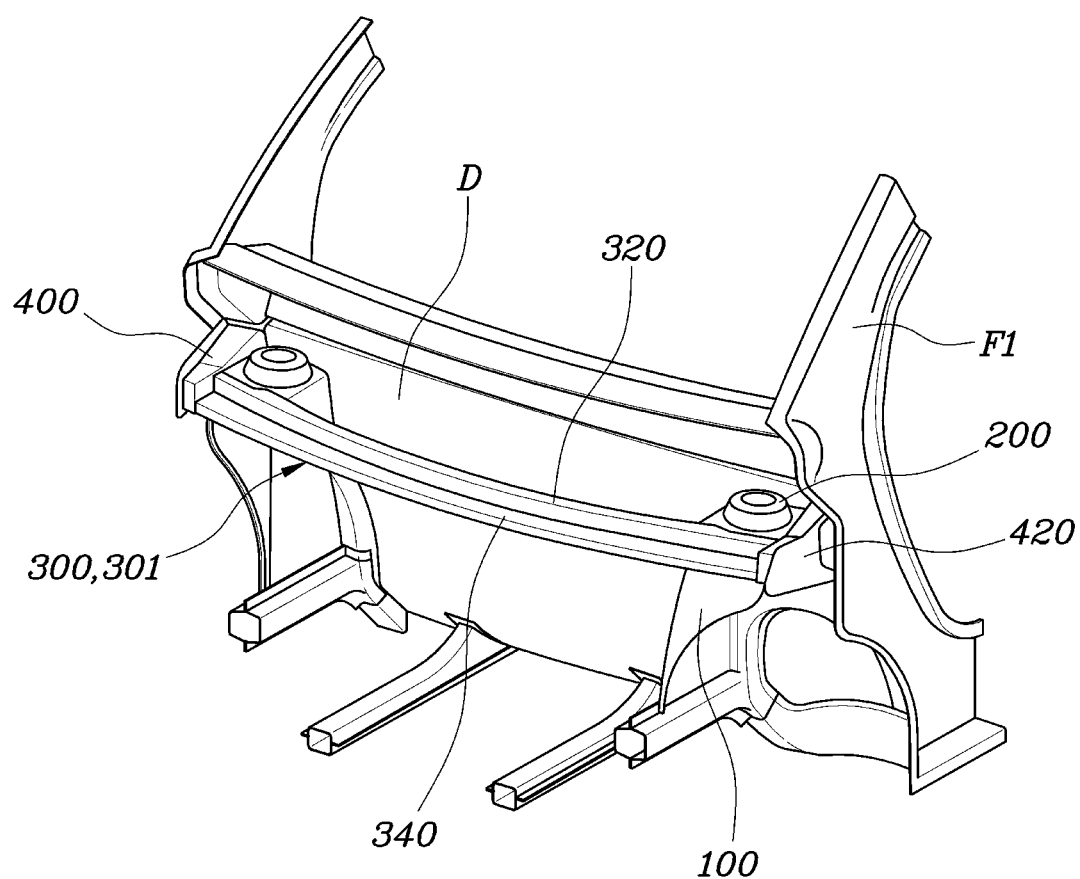
FIG. 3 is a view showing the coupling structure of inner front pillar panels of the front structure of a vehicle body according to the exemplary embodiment of the present invention.

As shown in FIGS. 2 and 3, the rear surface portion 320 of the cross member 300 may be coupled to the upper sides of the shock-absorber mounts 200 or to the upper sides of the shock-absorber housings 100, or may be coupled to the upper sides of the shock-absorber mounts 200 and to the upper sides of the shock-absorber housings 100. Specifically, the shock-absorber mounts 200 may be coupled to the upper sides of the shock-absorber housings 100 and thus, the front end portions of the shock-absorber mounts 200 may cover the front end portions of the shock-absorber housings 100, and the cross member 300 may be coupled to the shock-absorber mounts 200 and thus, the rear surface portion 320 of the cross member 300 may cover the front end portions of the shock-absorber mounts 200.

Figure 7:
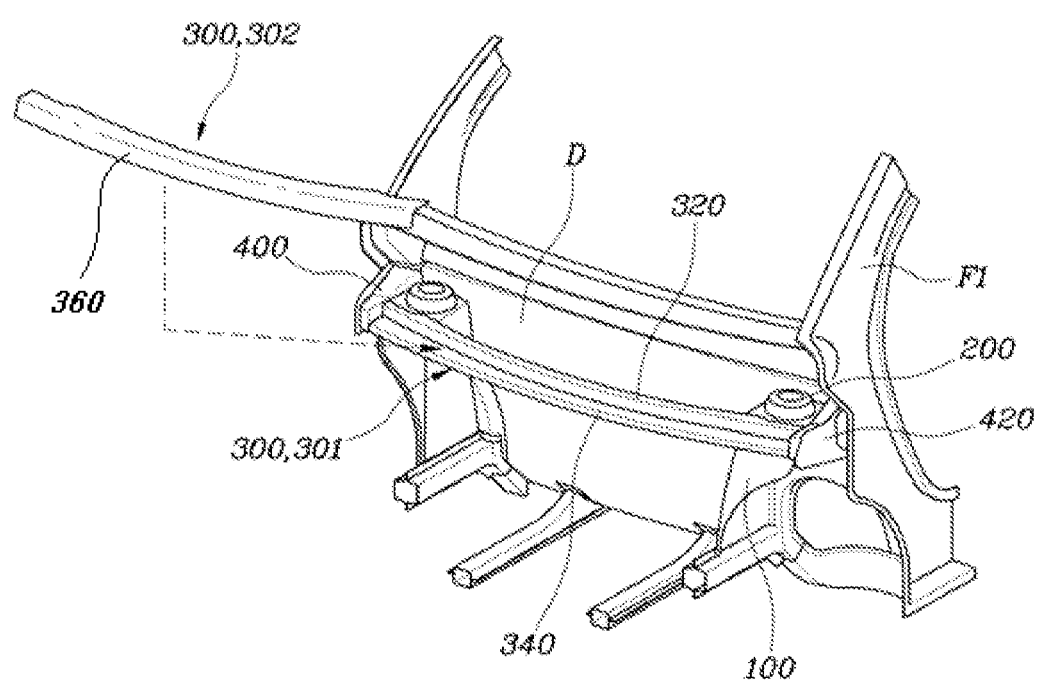
FIG. 7 is a view showing the state in which a second cross member is coupled to the first cross member in the front structure of a vehicle body according to the exemplary embodiment of the present invention.

FIG. 7 is a view showing the state in which a second cross member is coupled to a first cross member. Described in detail, as shown in FIGS. 2, 3 and 7, the cross member 300 may include a first cross member 300 (301), which includes a rear surface portion 320 that extends in the upward-and-downward or vertical direction of the vehicle and coupled to the front end portions of the shock-absorber mounts 200 and a bent portion 340 bent from the lower end of the rear surface portion 320 and that extends toward the front side of the vehicle body, and a second cross member 300 (302), which includes a front surface portion 360 that extends from the front end of the bent portion 340 of the first cross member 300 (301) toward the upper side of the vehicle body and a bent portion bent from the upper end of the front surface portion 360 and that extends toward the rear side of the vehicle body to be coupled to the upper end of the rear surface portion 320 of the first cross member 300 (301).

Accordingly, each of the first cross member 300 (301) and the second cross member 300 (302), which constitute the cross member 300, may have the bent portion, with the result that the cross member 300 has high rigidity with respect to distortion of the vehicle body. The cross member 300 shown in FIG. 1 may be formed by coupling the second cross member 300 (302) to the first cross member 300 (301).

In addition, as shown in FIG. 3, the front structure of a vehicle body according to the present invention may further include fender aprons 400, which extend from the front pillars F in the forward direction. Among the two side portions of each of the fender aprons 400, an inner side portion 420 that faces the interior of the vehicle body may be coupled to a respective one of the end portions of the cross member 300 and to the outer end of a respective one of the shock-absorber mounts 200. The fender aprons 400 function to further increase the rigidity of the vehicle body.

Described in more detail, as shown in FIGS. 1 and 3, the fender aprons 400 may extend forward from the front pillars F up to the end portions of the cross member 300. Since the body of a vehicle such as an electric vehicle has an extremely short front structure, the fender aprons 400 extend only to the end portions of the cross member 300. The fender aprons 400 function not only to secure the rigidity of the vehicle body with respect to head-on collision impact, but also to define an impact load path.

As shown in FIG. 1, each of the fender aprons 400 may include an inner fender apron 420, which defines an inner side portion 420, and an outer fender apron 440, which defines an outer side portion 440. The inner fender apron 420 may be welded to the cross member 300 and to a respective one of the shock-absorber mounts 200, and the outer fender apron 440 may be welded to the inner fender apron 420. In other words, the inner fender apron 420 and the outer fender apron 440 may be combined into a single member, and define an impact load path along which an impact is transferred to the front pillars F during a collision.

The front structure of a vehicle body according to the present invention further includes inner front pillar panels F1, each of which is formed in a panel shape and each of which includes an upper portion that extends along the front windshield glass W and a lower portion that extends along the dash panel D. The inner front pillar panels F1 may be coupled to the rear ends of the inner fender aprons 420, and thereafter may be coupled to the lateral sides of the vehicle body together with the inner fender aprons 420. The inner front pillar panels F1, which are coupled to the lateral sides of the vehicle body in the above-described manner, define a load path together with the fender aprons 400 and the dash panel D. Thus, the impact that is dispersed to the shock-absorber mounts 200 and the inner fender aprons 420 via the cross member 300 is transferred to the inner front pillar panels F1.

Figure 4:
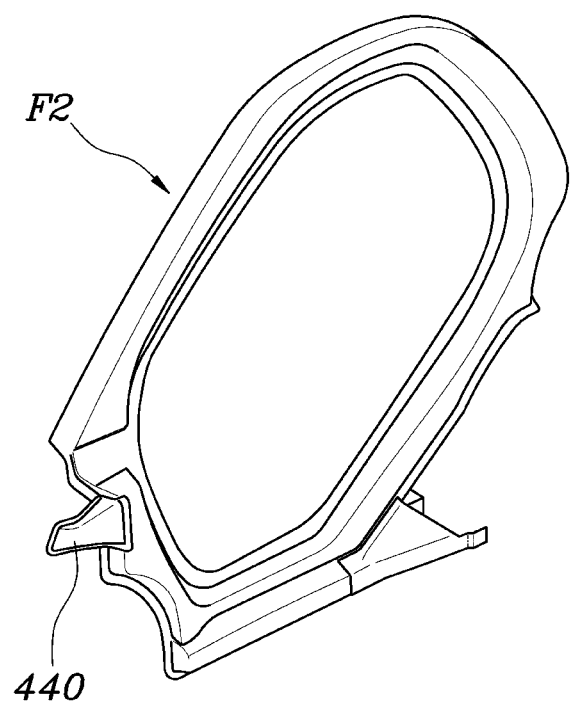
FIG. 4 is a view showing an outer side panel of the front structure of a vehicle body according to the exemplary embodiment of the present invention.

As shown in FIGS. 1 and 4, the front structure of a vehicle body according to the present invention may further include outer side panels F2, each of which is formed as an annular-shaped panel that extends along the periphery of the door. The outer side panels F2 may be coupled to the outer fender aprons 440, and thereafter may be coupled to the sides of the inner front pillar panels F1 and to the sides of the inner fender aprons 420 together with the outer fender aprons 440. Each of the outer side panels F2 extends in an annular-shaped or ring-shaped structure to define the periphery of the door. The front end portion of each of the outer side panels F2 is coupled to the outer side of a that corresponds to one of the inner front pillar panels F1 to form a member having a closed cross-section together with a corresponding one of the inner front pillar panels F1.

The members that are formed by the coupling of the inner front pillar panels F1 and the outer side panels F2 serve as fenders. These fenders define a load path together with the cross member 300. Further, to secure continuity of the load path, the inner front pillar panels F1 may be coupled to the inner fender aprons 420, and the outer side panels F2 may be coupled to the outer fender aprons 440.

Figure 5:
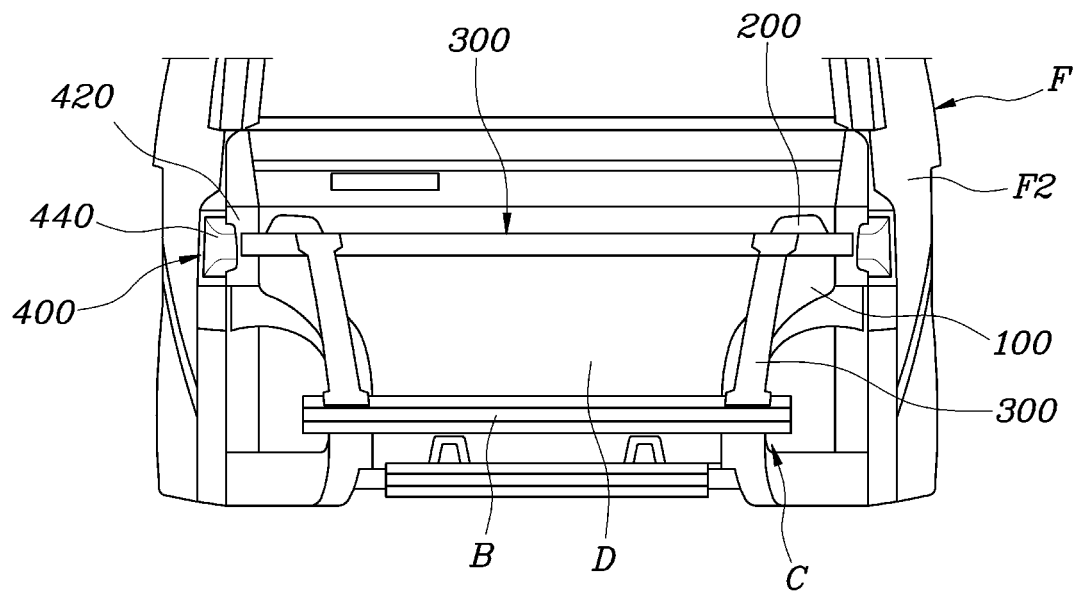
FIG. 5 is a front view showing the front structure of a vehicle body according to the exemplary embodiment of the present invention.

In addition, as shown in FIGS. 1 and 5, the front structure of a vehicle body according to the present invention may further includes connection parts 500, each of which extends in the upward-and-downward or vertical direction of the vehicle and each of which has an upper end portion connected to the cross member 300 and a lower end portion connected to a bumper support beam B of the vehicle body. As shown in the drawings, since the cross member 300 and the bumper support beam B are arranged in the vertical direction and are connected to each other via the connection parts 500, a collision load may be dispersed along various paths. As a result, even when the front structure of the vehicle body is substantially reduced in length, the front structure may absorb as much impact as possible to minimize the transfer of impact to the interior space of the vehicle, thereby reducing the peak value of the maximum amount of impact that is applied to a seat of the vehicle.

As shown in FIG. 5, the connection parts 500 may include a pair of left and right connection parts. The left and right connection parts 500 may be connected at the upper end portions thereof to the end portions of the cross member 300 and may be connected at the lower end portions thereof to the end portions of the bumper support beam B.

Described in more detail, the upper end portion of each of the connection parts 500 may be coupled to a portion of the cross member 300 that is opposite the portion of the cross member 300 to which a corresponding one of the shock-absorber mounts 200 is coupled. The lower end portion of each of the connection parts 500 may be coupled to the upper end of the portion of the bumper support beam B to which a corresponding one of crash boxes C is coupled. Accordingly, since the upper end portion of each of the connection parts 500 may be coupled to a portion of the cross member 300 that is opposite the portion of the cross member 300 to which a corresponding one of the shock-absorber mounts 200 is coupled, the impact of a head-on collision may be transferred to the shock-absorber mounts 200 via the cross member 300. Similarly, since the lower end portion of each of the connection parts 500 is coupled to the upper end of the portion of the bumper support beam B to which a corresponding one of the crash boxes C is coupled, the impact of a head-on collision may be transferred to the crash boxes C via the bumper support beam B.

As is apparent from the above description, the present invention provides a front structure of a vehicle body, particularly a front structure of a body of a micro-mobility vehicle having an extremely short front overhang, which may be installed to prevent interference with parts of a chassis of the vehicle and which may secure improved impact resistance and may increase the rigidity of the vehicle body and the rigidity of a mounting part.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A front structure of a vehicle body, comprising:
shock-absorber housings disposed between a front side of a dash panel and a lower end of a front windshield glass, the shock-absorber housings being disposed at upper sides thereof with shock-absorber mounts to which shock absorbers are mounted;
a cross member that extends in a lateral direction of a vehicle while being spaced apart from the dash panel in a forward direction, the cross member including a rear surface portion, each of opposite ends of the rear surface portion being coupled to a front end portion of a respective one of the shock-absorber housings; and
connection parts that extend in a vertical direction of the vehicle,
wherein each of the connection parts includes an upper end portion connected to the cross member and a lower end portion connected to a bumper support beam of the vehicle,
wherein the connection parts include a pair of left and right connection parts, and wherein the left and right connection parts are connected at upper end portions thereof to end portions of the cross member and are connected at lower end portions thereof to end portions of the bumper support beam, and
wherein each of the upper end portions of the connection parts is coupled to a portion of the cross member that is opposite a portion of the cross member to which a corresponding one of the shock-absorber mounts is coupled.

2. The front structure according to claim 1, wherein the shock-absorber housings are directly coupled to a front surface portion of the dash panel.

3. The front structure according to claim 1, wherein the rear surface portion of the cross member is coupled to upper sides of the shock-absorber mounts or to upper sides of the shock-absorber housings, or is coupled to the upper sides of the shock-absorber mounts and to the upper sides of the shock-absorber housings.

4. The front structure according to claim 3, wherein the shock-absorber mounts are coupled to upper sides of the shock-absorber housings such that front end portions of the shock-absorber mounts cover front end portions of the shock-absorber housings, and wherein the cross member is coupled to the shock-absorber mounts such that the rear surface portion of the cross member covers front end portions of the shock-absorber mounts.

5. The front structure according to claim 4, wherein the cross member includes:
a first cross member having a rear surface portion, that extends in an upward-and-downward direction of the vehicle and coupled to the front end portions of the shock-absorber mounts, and a bent portion, bent from a lower end of the rear surface portion and that extends toward a front side of the vehicle; and
a second cross member having a front surface portion, that extends from a front end of the bent portion of the first cross member toward an upper side of the vehicle, and a bent portion, bent from an upper end of the front surface portion and extending toward a rear side of the vehicle to be coupled to an upper end of the rear surface portion of the first cross member.

6. The front structure according to claim 1, further comprising:
fender aprons that extend in a forward direction,
wherein, among two side portions of each of the fender aprons, an inner side portion that faces an interior of the vehicle is coupled to a respective one of end portions of the cross member and to an outer end of a respective one of the shock-absorber mounts.

7. The front structure according to claim 6, wherein the fender aprons extend forwards from front pillars up to the end portions of the cross member.

8. The front structure according to claim 7, wherein each of the fender aprons includes an inner fender apron, defining an inner side portion, and an outer fender apron, defining an outer side portion, wherein the inner fender apron is welded to the cross member and to a respective one of the shock-absorber mounts, and wherein the outer fender apron is welded to the inner fender apron.

9. The front structure according to claim 8, further comprising:
inner front pillar panels formed in a panel shape, the inner front pillar panels having an upper portion, that extends along the front windshield glass, and a lower portion, that extends along the dash panel,
wherein each of the inner front pillar panels is coupled to a rear end of the inner fender apron, and is coupled to a respective one of lateral sides of the vehicle body together with the inner fender apron.

10. The front structure according to claim 9, further comprising:
outer side panels formed as annular-shaped panels that extend along peripheries of doors of the vehicle,
wherein each of the outer side panels is coupled to the outer fender apron, and is coupled to a side of a respective one of the inner front pillar panels and to a side of the inner fender apron together with the outer fender apron.

11. The front structure according to claim 1, wherein each of the lower end portions of the connection parts is coupled to an upper end of a portion of the bumper support beam to which a corresponding one of crash boxes is coupled.

* * * * *